Patented Dec. 13, 1932

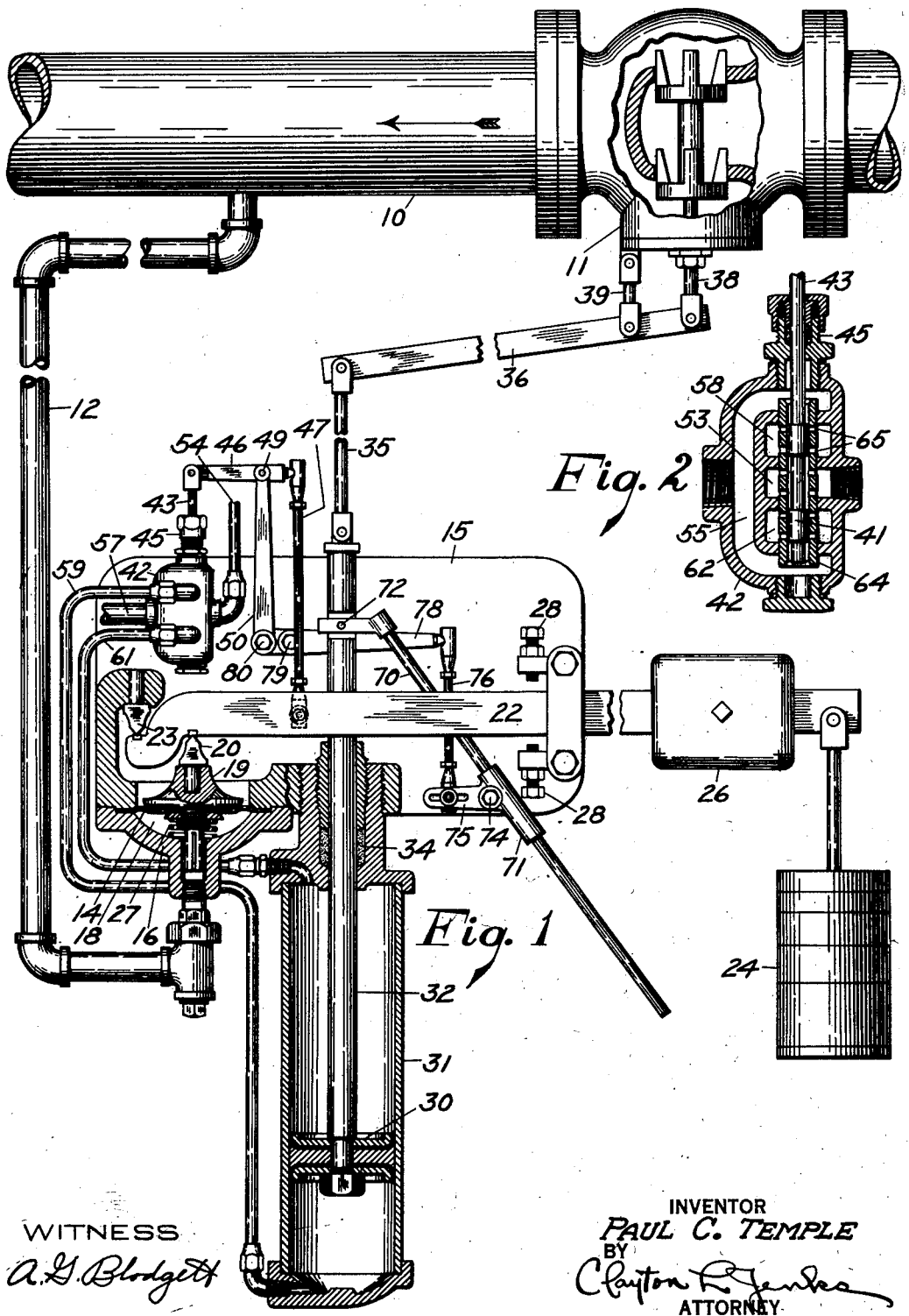

1,890,472

UNITED STATES PATENT OFFICE

PAUL C. TEMPLE, OF DECATUR, ILLINOIS, ASSIGNOR TO A. W. CASH COMPANY, OF DECATUR, ILLINOIS, A CORPORATION OF DELAWARE

REGULATING APPARATUS

Application filed December 9, 1929. Serial No. 412,848.

This invention relates to regulating apparatus, and more particularly to a power operated mechanism arranged to actuate a control device in accordance with variations in the pressure of a controlling fluid.

Regulating apparatus of this type has been generally utilized to control various types of electrical devices such as rheostats and to regulate the operation of valves and dampers employed to control fluid flow. For example, it is often desirable to so operate a damper or a valve that the flow of a liquid or gas through a pipe may be regulated to give a substantially uniform pressure on the discharge side of the valve or damper. As another example, a damper used in connection with a furnace may be so regulated that the combustion in the furnace will produce a required steam pressure or other desired condition of furnace operation. It is customary to use a power operated motor in a relay circuit to move the damper or other control part, and to control this motor by means of a pressure responsive device operated by the pressure in the fluid control system. If the motor is, for example, hydraulically operated and its controlling valve is moved solely by the pressure responsive device, there occurs the so-called hunting effect, whereby the damper constantly swings between its extreme limiting positions. For that reason it is desirable to provide a compensating mechanism which causes the damper or other controlled member to take certain definite positions which bear definite relations to the pressures in the fluid pressure controlling system, so that the damper or other part being regulated will remain stationary while the pressure in the control system remains uniform, and a slight change in control pressure will produce only a slight change in the position of the damper.

A compensating device may operate on what is known as the straight line principle, which means that if the range of permitted pressure variation in the fluid pressure control system is, say, eight pounds then the travel of the operative part of the motor will be directly proportional to the variation in this eight pounds pressure difference; that is, two pounds pressure difference will cause the motor part to move one-quarter of its full distance. If now such a motor part is connected to a damper in an air pipe, then when the damper is in its midway and open position a movement of the damper through one-quarter of its total path of travel, as represented by the two pounds variation in fluid pressure, will not change the capacity of the pipe by 25% but this change in air flow will be comparatively slight. On the other hand, if the damper is at first entirely closed, then a two pounds variation in fluid control pressure will open the damper to give a far greater air flow than the desired 25%. For example, it has been found that a 28% damper opening results in approximately a 50% damper capacity. It is, therefore, important for certain types of regulating apparatus that the change in fluid flow, and not the distance through which the damper or other part being controlled is moved, be directly proportional to the variation in pressure in the control system.

As a further desirable feature, a compensating apparatus of this type should be so constructed that the operating range of the control pressure may be varied as desired. For example, in the illustration given above it may be desirable to have the apparatus work within narrower limits than eight pounds variation in the control pressure, and for this reason the apparatus should be flexible in its adjustment so that the motor and therefore the damper or other part which is ultimately moved may be moved through its entire operating stroke when the pressure variation in the control system is, say, two or four pounds. This means that the pressure in the control system may vary anywhere within the range of, say, two pounds and while it is within this range the motor and consequently the damper or other part being controlled will remain stationary in certain definite positions without any hunting effect, but if the pressure variation should go beyond that two pound limit then the motor and the control'ed part will move to a final limiting position and cause the system to return to the desired pressure within that two pound limit. These compensating mechanisms as heretofore constructed have presented certain inherent defects or have been complicated in construction or expensive to manufacture and have not been positive in action and so have been unreliable.

It is, therefore, the primary object of this invention to provide a regulating apparatus of this general type which overcomes defects previously found in such devices and in general to provide a simple construction which may be easily and cheaply manufactured and which is sure in its operation, which is extremely sensitive and will respond to the slightest change in the controlling pressure and which in particular is capable of giving a regulation in which the change in the ultimate result is directly proportional to the change in the pressure of the control system.

A further object of the invention is to provide a regulating apparatus of this general type which may be readily adapted to various installation conditions and control line pressures and in which the operating range or the control pressure change required to move the regulator through its entire stroke may be easily adjusted as desired.

With these and other objects in view, as will be apparent to those skilled in the art, my invention resides in the combination of parts set forth in the specification and covered by the claims appended hereto.

Referring to the drawing illustrating one embodiment of my invention, in which like reference numerals indicate like parts:

Fig. 1 is an elevation, partly in section, of a regulating apparatus connected to a control valve and arranged to control the pressure of fluid on the discharge side of the valve; and Fig. 2 is an enlarged cross section of the four-way pilot valve which controls the movements of the regulator piston.

The specific form of apparatus shown in the drawing comprises a fluid pressure responsive device arranged to control the movements of a power actuated member, and a compensating mechanism which serves to stop the movements of the power actuated member and causes it to take positions which bear a definite relation to the changes in the pressure on the pressure responsive device but which are not directly proportional to these changes. For the pressure responsive device, I have shown a flexible diaphragm which is loaded by means of a weighted lever supported on knife edges to balance the controlling pressure. For the power actuated member, I utilize a motor having a part movable thru a definite range, and this motor in the form illustrated comprises a fluid pressure operated piston controlled by means of a pilot valve which is moved by the weighted lever, the piston rod being connected to the apparatus to be regulated. When the pressure responsive device moves, this serves initially to move the valve and cause the motor piston to move. For the compensating mechanism, I provide two members, one of which is pivotally mounted on some stationary part of the apparatus and connected to operate the pilot valve, and the other of which is pivoted to the piston rod, or to some part moved thereby, and arranged to slide relative to the first member. These parts are so arranged that movement of the piston will cause the second member to slide relative to the first and turn it about its pivot because of the change in angle of the second member, thus returning the pilot valve to its initial position and stopping further movement of the piston. Moreover, the construction is such that the change in angle of the second compensating member will be less for a given piston movement as the valve or other device being regulated approaches its open position, as the result of a decrease in the pressure in the control system, and consequently a given change in control pressure will produce substantially the same change in valve capacity, whether the valve is nearly closed or nearly open.

The embodiment of the invention illustrated in the drawing comprises a regulating apparatus arranged to control the pressure in a pipe line 10 by means of a balanced valve 11 in the line. This valve is of the ordinary double disk type well known in the art. Steam or other fluid is flowing through the pipe in the direction of the arrow.

The pressure in the pipe 10 on the discharge side of the valve is transmitted through a control pipe 12 to a pressure responsive flexible diaphragm 14. This diaphragm is clamped at its periphery between an annular portion of the supporting frame 15 of the regulating apparatus, and a hollow concavo-convex cap 16 which forms a pressure chamber 18 beneath the diaphragm. The pipe 12 is connected to this chamber. A pressure plate 19 is fastened to the upper side of the diaphragm and carries an upwardly extending knife edge 20 which supports a lever arm or beam 22. A downwardly extending knife edge 23 carried by the frame 15 forms a stationary pivot for the arm 22 near one end, and a weight 24 is hung on the opposite end of the arm to balance the pressure on the lower side of the diaphragm. A slidable weight 26 may also be mounted on the lever arm if desired, thus providing a convenient means for adjusting the pressure which the apparatus will maintain. A light compression spring 27 beneath the diaphragm serves to maintain the knife edge 20 in proper contact with the lever arm at all times, even though the pressure in the chamber 18 should fail. Adjustable screws 28 above and below the lever arm serve as stops to limit the amount of its movement.

The lever arm 22 will assume a position between the stops 28 proportional to the pressure in the chamber 18. This is because of the well known fact that the effective area of a flexible diaphragm changes as it moves in response to a pressure change. Assume the pressure in chamber 18 increases slightly. The lever arm will be raised slightly and the effective area of the diaphragm will be reduced because of the upward movement. This reduction in effective area will compensate for the increased pressure, and the arm will thus remain balanced in its new position until a further pressure change occurs. In a similar manner, a reduction of pressure in chamber 18 will lower the arm and increase the effective area of the diaphragm, thus compensating for the reduced pressure, and the arm will remain balanced in a new position.

I utilize the movements of the beam 22 in response to pressure change to control the movements of a piston 30 mounted in a stationary vertical cylinder 31 supported by the frame 15. A piston rod 32 joined to the piston extends upwardly through a stuffing box 34 in the upper end of the cylinder. The piston rod 32 is connected by a link 35 to one end of a lever 36. The opposite end of the lever is pivoted to the stem 38 of the balanced valve 11, and the lever is supported intermediate its ends by a link 39 mounted on the valve casing. These parts are so proportioned that when the piston 30 is at the lower limit of its movement in the cylinder 31, the valve 11 will be completely closed, and when the piston is at the upper limit of its movement the valve will be fully open. The amount of valve opening is at all times directly proportional to the distance the piston has moved from its lowermost position.

The piston 30 is actuated by fluid pressure under the control of a pilot valve 41 connected to the beam 22. This valve is preferably of the well known balanced piston type and is mounted in a valve casing 42 supported on the frame 15. The stem 43 of the valve extends upwardly through a stuffing box 45 in the casing and is pivoted to one end of a lever 46. The other end of the lever is joined by means of a link 47 to the beam 22. The lever 46 is supported intermedite its length on a fulcrum 49 formed on the upper end of a link 50. These parts are so arranged that whenever the beam 22 is raised by an increase in pressure in chamber 18, the pilot valve 41 will move downwardly, and vice versa.

The valve casing 42 is divided internally by means of partitions into four separate chambers. The central chamber 53 is supplied with fluid under pressure through a pipe 54. This operating fluid may be air, water, oil or any other suitable gas or liquid as desired. The exhaust chamber 55 extends to both ends of the casing and is connected to an exhaust pipe 57, which is intended to carry away the spent operating fluid, the disposal of which depends upon its character. If compressed air is being used, the pipe 57 may discharge to atmosphere. If water is being used, the discharge pipe will lead to a drain. If oil is used, it is returned to a reservoir. Above the central inlet chamber 53, and between the inlet chamber and the exhaust chamber, I provide a chamber 58 which is connected by a pipe 59 to the lower end of the cylinder 31. The upper end of the cylinder is connected by a pipe 61 to a chamber 62 directly beneath the inlet chamber 53. For convenience in manufacture I preferably provide a hollow cylindrical sleeve 64 in which the valve 41 is slidable and which extends vertically through the chambers 58, 53 and 62. Ports 65 in the wall of the sleeve provide passages leading between each of these chambers and the interior of the sleeve, and the ends of the sleeve open into the exhaust chamber 55.

The pilot valve 41 and its associated parts are so arranged that whenever the valve is in the neutral position shown in Fig. 2, both ends of cylinder 31 are cut off from communication with the inlet chamber 53 and the exhaust chamber 55, and as a result the piston 30 is held stationary. If the valve is moved downwardly from its neutral position, chamber 62 and the upper end of the cylinder are connected to the inlet chamber 53, while at the same time chamber 58 and the lower end of the cylinder are connected to the exhaust chamber 55. This will admit fluid above the piston 30 and cause it to move downwardly. In a similar manner, if the valve 41 is moved upwardly from its neutral position, fluid will be admitted beneath the piston 30, the upper end of the cylinder will be connected to the exhaust, and the piston will move upwardly.

With the construction as so far described the piston will travel all the way to the end of its stroke after it has once been started. This of course is not desirable, and as the chief feature of my invention I provide a compensating mechanism which serves to return the pilot valve to its neutral position and thus stop the piston after a predetermined movement, the extent of which bears a definite relationship to the change of pressure in the diaphragm chamber. This relationship is such that the extent of piston movement in response to a given pressure change is progressively decreased as the piston moves downwardly and the balanced valve 11 approaches its closed position. As a result, valve capacity is changed substantially in direct proportion to changes in control line pressure, and very smooth and accurate regulation is obtained.

The compensating mechanism illustrated comprises a pair of relatively slidable members 70 and 71. The member 70 is shown as a cylindrical rod having its upper end pivoted to the piston rod 32 by means of a pin 72.

This rod extends downwardly at a considerable angle with respect to the piston rod. The member 71 is pivoted to the frame by means of a bolt 74, and is shaped to slidably receive the rod 70. The member 71 has formed integral therewith a horizontally projecting slotted extension or arm 75, which is connected by means of a link 76 to one end of a lever 78. The effective length of the extension 75 may be varied by adjusting the lower end of the link 76 along the slot. The lever 78 is pivoted to the frame 15 by means of a bolt 79 intermediate of its length, and the end opposite the link 76 is pivoted to the lower end of link 50 by means of a bolt 80. In this way the compensating mechanism is arranged to coact with the connection between the weighted beam and the pilot valve.

The operation of the invention will now be apparent from the above disclosure. If the pressure in the control line 12 drops slightly, perhaps because of increased demand from pipe line 10, then the beam 22 will be lowered a distance proportional to the pressure drop, and will come to rest in its new position because of the change in effective area of the diaphragm. As beam 22 moves downwardly, it will act through link 47 to rock lever 46 about pin 49 as a fulcrum, thus raising valve 41. This will admit fluid to the lower end of the cylinder 31 through pipe 59, causing piston 30 to move upwardly and opening balanced valve 11 to take care of the increased demand. As the piston rod moves upwardly it will carry with it the slide rod 70, which will slide through the member 71 while at the same time turning it about its pivot 74 in a clockwise direction because of the change in the angular position of the slide rod. This movement of the member 71 will be transmitted through link 76, lever 78, and link 50, thus rocking lever 46 about the upper end of link 47 as a fulcrum, lowering pilot valve 41 to its neutral position and stopping piston 30 in a new position.

As the piston 30 moves upwardly, the slide rod 70 will turn about its pivot 72 in a clockwise direction into a more nearly vertical position, that is, more nearly parallel with the axis of the piston rod, and the piston will have to travel for a greater distance to produce a given compensating effect than when it was in a lower position. As a result, equal increments of control line pressure increase will impart progressively decreasing increments of movement to the piston 30 and the valve 11 as the latter moves towards its closed position, thus regulating the capacity of valve 11 substantially in direct proportion to changes in the pressure on the diaphragm.

By merely adjusting the lower end of link 76 along the slot in arm 75, it is possible to alter the operating range of the regulator, that is, the amount of pressure change required to move the piston 30 through the full length of its stroke. An increase in the effective length of arm 75 will increase the operating range, and vice versa. Where the demand for fluid through the valve 11 varies greatly, an increased operating range is desirable as tending toward smoother operation.

The regulator is extremely sensitive, and the slightest pressure change in either direction will effect the balanced beam and cause piston movement under great power. The piston does not move in steps, but will float and can assume an infinite number of positions under the control of the pressure on the diaphragm and in a definite relationship thereto. The compensating mechanism is positive in its action and will stop the piston at a definite position corresponding to the change in controlling pressure.

Having thus described my invention, what I claim as new and desire to secure by Letters Patent is:

1. A regulating apparatus comprising a fluid pressure responsive device, a reversible hydraulic motor having a piston and a piston rod movable between limiting positions, a pilot valve moved by said fluid pressure responsive device and connected to control the movements of the piston, a member which is pivoted to a stationary portion of the apparatus, a rod pivoted to the piston rod at an angle thereto and arranged to slide relative to said member and control its angular position, and connections between said member and the pilot valve, said parts being so constructed and arranged that as the piston moves in response to an increase in the controlling fluid pressure, the rod will make a greater angle with the piston rod and equal increments of increase of controlling fluid pressure will produce decreasing increments of piston movement.

2. A regulating apparatus comprising a flexible diaphragm responsive to a controlling fluid pressure, a weighted beam pivotally supported and arranged to move with the diaphragm, a reversible hydraulic motor having a piston and a piston rod movable between limiting positions, a slidable pilot valve connected to control the movements of the piston, a lever pivotally connected to the pilot valve, means connecting the lever to the beam, a member which is pivoted to a stationary portion of the apparatus, means connecting said member with the lever, and a rod pivoted to the piston rod at an angle thereto and arranged to slide relative to said member and control its angular position, said parts being so constructed and arranged that as the piston moves in response to an increase in the controlling fluid pressure, the rod will make a greater angle with the piston rod and equal increments of increase of controlling fluid pressure will produce decreasing increments of piston movement.

3. A regulating apparatus comprising a fluid pressure responsive device, a reversible power actuated motor having a part movable between limiting positions, a control device moved by said fluid pressure responsive device and connected to control the movements of said motor, and a compensating mechanism, including a member pivotally connected to said movable part and arranged to change its angular position as said part moves, and a member pivotally mounted on a stationary portion of the apparatus and connected to the control device and arranged to slidably support the angularly movable member, which is so constructed that the motor part will be moved successively through decreasing increments of distance throughout its entire movement as the controlling fluid pressure increases by equal increments.

4. In combination with a fluid flow controlling device movable between an open and a closed position, a regulating apparatus comprising a reversible hydraulic motor having a piston and a piston rod movable between limiting positions, connections between the piston rod and the flow controlling device, a pilot valve connected to control the movements of the piston, a device to move the pilot valve, and a compensating mechanism including a member pivoted to a stationary portion of the apparatus, a rod pivoted to the piston rod at an angle thereto and arranged to slide relative to said member and control its angular position, and connections between said member and the pilot valve, said parts being so constructed and arranged that as the piston moves to close the flow controlling device the rod will make a greater angle with the piston rod and the compensating action will be increased.

5. A regulating apparatus comprising a fluid pressure responsive device, a reversible hydraulic motor having a piston and a piston rod movable between limiting positions, a pilot valve moved by said fluid pressure responsive device and connected to control the movements of the piston, a member which is pivoted to a stationary portion of the apparatus, a rod pivoted to the piston rod at an angle thereto and arranged to slide relative to said member and control its angular position, and connections between said member and the pilot valve which are adjustable to vary the operating range of the apparatus, said parts being so constructed and arranged that as the piston moves in response to an increase in the controlling fluid pressure, the rod will make a greater angle with the piston rod and equal increments of increase of controlling fluid pressure will produce decreasing increments of piston movement.

Signed at Decatur, Illinois, this fourth day of December, 1929.

PAUL C. TEMPLE.